Figure 1:
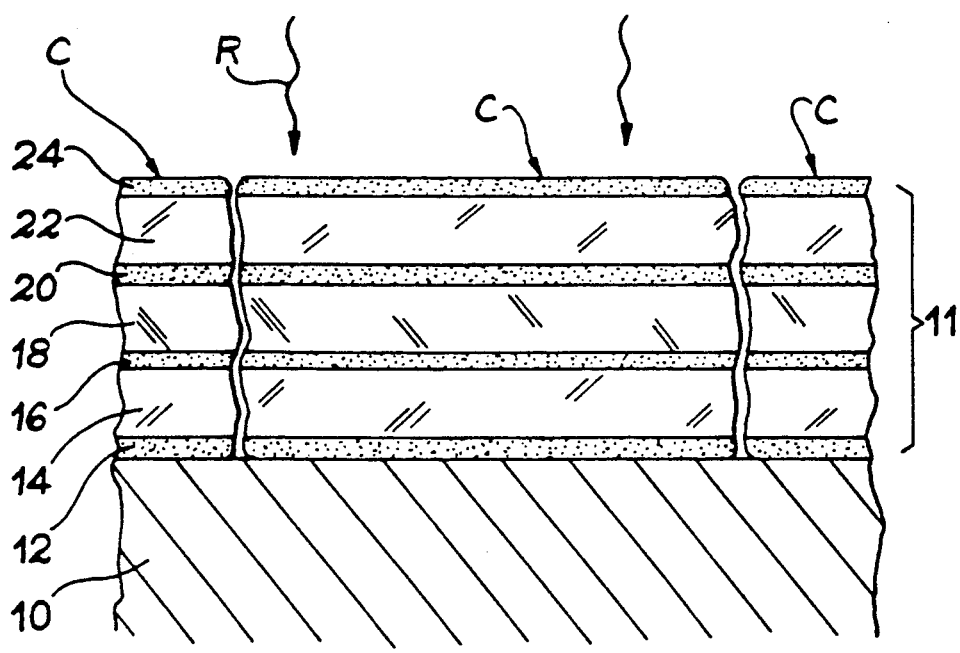

United States Patent [19]

Kumurdjian

[11] Patent Number: 5,148,172
[45] Date of Patent: Sep. 15, 1992

[54] ABSORBING COATING, ITS PROCESS OF MANUFACTURE AND COVERING OBTAINED WITH THE AID OF THIS COATING

[75] Inventor: Pierre Kumurdjian, St Cheron, France

[73] Assignee: Commissariat A l'Energie Atomique, Paris, France

[21] Appl. No.: 300,649

[22] Filed: Jan. 13, 1989

[30] Foreign Application Priority Data

Jan. 18, 1988 [FR] France .................. 88 00495

[51] Int. Cl.⁵ .............................................. H01Q 17/00
[52] U.S. Cl. .............................................. 342/1
[58] Field of Search ............. 342/1; 427/180, 196; 428/402, 403, 407, 457

[56] References Cited

U.S. PATENT DOCUMENTS

| | | | |
|---|---|---|---|
| 2,923,934 | 2/1960 | Halpern | 342/1 |
| 2,992,426 | 7/1961 | Borcherdt | 343/18 |
| 3,540,047 | 12/1970 | Walser et al. | 342/1 |
| 3,843,593 | 10/1974 | Shell et al. | 260/40 |
| 3,887,920 | 6/1975 | Wright et al. | 342/1 |
| 3,938,152 | 2/1976 | Grimes et al. | 343/18 |
| 4,003,840 | 1/1977 | Ishino et al. | 252/62 |
| 4,006,479 | 2/1977 | LaCombe | 343/18 |
| 4,173,018 | 10/1979 | Dawson et al. | 342/1 |
| 4,378,322 | 3/1983 | Atterbury et al. | 428/402 X |
| 4,606,848 | 8/1986 | Bond | 252/511 |
| 4,624,798 | 11/1986 | Gindrup et al. | 428/403 X |
| 4,624,865 | 11/1986 | Gindrup et al. | 428/403 X |
| 4,777,205 | 10/1988 | La Scola et al. | 524/440 |
| 4,862,174 | 8/1989 | Natio et al. | 342/1 |
| 4,886,714 | 12/1989 | Torii et al. | 428/694 |
| 4,920,013 | 4/1990 | Kobayashi et al. | 428/694 |

Primary Examiner—Mark Hellner
Attorney, Agent, or Firm—Kerkam, Stowell, Kondracki & Clarke

[57] ABSTRACT

Absorbing coating, its process of manufacture and covering obtained with the aid of this coating.

The coating is characterized in that it comprises a binder (34) and a load consisting of chips (C) consisting of a stack of thin layers, this stack being capable of absorbing an electromagnetic radiation.

Application in microwaves, infrared etc.

12 Claims, 2 Drawing Sheets

ABSORBING COATING, ITS PROCESS OF MANUFACTURE AND COVERING OBTAINED WITH THE AID OF THIS COATING

DESCRIPTION

The present invention relates to an absorbing coating, its process of manufacture and a covering obtained with the aid of this coating. It is used in the absorption of electromagnetic radiation, for example in the microwave range (microwave ovens, anechoic chambers, telecommunications, microwave guides, etc. . . . ) but also in the visible or infrared range.

Certain known materials absorbing microwaves are available in the form of layers of thickness of the order of one centimeter, which layers are formed with dense ferrite materials or materials obtained by dispersion of dense materials in an appropriate organic binder.

In particular, ferrite tiles absorbing microwaves between 100 and 1,000 MHz are currently found in the trade, with a thickness of 5 to 15 mm. Loaded organic composite materials are also found, such as rubbers loaded with ferrites or metals. The operating frequency varies from 5 to 15 GHz, and the thickness is within the range between 1 and 5 mm.

Other known materials absorbing microwaves include pyramidal patterns or alveolar structures exhibiting a thickness of a few tens of centimeters. These materials are generally used for equipping anechoic chambers.

Furthermore, French Patent Application EN 87/12971 discloses an absorbing composite material, which comprises a stack of alternately magnetic and insulating layers. Each layer of magnetic material is formed of a plurality of blocks which are separated from one another by electrically insulating spaces or joints.

This composite material, constructed in the form of a stack of thin layers, may exhibit a total thickness less than one millimeter; in spite of the high density (8 to 9 g/cm$^3$) of the magnetic material, this leads to a covering having a low surface density of the order of 0.5 to 1 kg/m$^2$.

In such a material, the absorption of the radiation is linked to phenomena of losses by rotation of the magnetization in the magnetic layers, of exchange interaction, of dielectric losses, etc. . . .

Although satisfactory in certain respects, these composite materials do, however, exhibit disadvantages:

as the thin layers are deposited on surfaces of large dimensions (in relation to the wavelength of the radiation to be absorbed), it is necessary to engrave them in order to limit the surface currents which would produce a reemission of the wave; this operation is difficult to perform on large surfaces with the required precision;

the covering obtained is effective only for a narrow frequency band (or, if desired, wavelength range);

the surface on which the deposit is effected must be machined with a high precision (optical polishing) and virtually plane.

Coverings absorbing visible or near infrared radiation are also known, which consist of a stack of transparent dielectric layers exhibiting alternating refractive indices. The materials constituting these layers are, in general, oxides. The phenomenon of absorption is then of the interferometric type.

Here again, although satisfactory in certain respects, these coverings exhibit disadvantages:

the deposit must be effected in a high-vacuum chamber; this prohibits the treatment of parts of large dimensions, the surface to be covered must exhibit an excellent quality (optical polishing), the selectivity obtained is large, just on account of the interferometric character of the phenomena utilized.

The specific object of the present invention is to remedy all these disadvantages, by proposing a coating which may serve for covering parts of any shape and dimensions, of any surface condition, and which permits a very large range of absorption to be obtained.

Specifically, the subject of the present invention is a coating, which is characterized in that it comprises a binder and a load consisting of chips consisting of a thin layer, which is capable of absorbing an electromagnetic radiation.

When it is desired to absorb a radiation which falls within the microwave range, each chip consists of a stack of alternately amorphous magnetic and electrically insulating layers.

Preferably, the amorphous magnetic material is a ferromagnetic material having a high magnetic permeability.

Further preferably, the magnetic material is an alloy of cobalt and of at least one element selected within the group comprising zirconium and niobium.

The magnetic layers may have a thickness within the range between 100 and 1,000 nm.

The insulating layers may have a thickness within the range between 1 and 200 nm.

When it is desired to absorb a radiation which falls within the visible or the near infrared, each chip consists of a stack of layers which are transparent to the radiation, the refractive index of these layers alternating.

In order to obtain an absorption over a very broad range, the coating may comprise various types of chips having differing absorption characteristics.

The subject of the present invention is also a process for the manufacture of the coating which has just been defined. This process comprises the following operations:

a stack of thin layers is deposited on a substrate under vacuum, this stack being capable of absorbing an electromagnetic radiation, this stack is splintered in order to reduce it to chips, these chips are mixed with a binder.

The subject of the present invention is also a covering which comprises at least one layer of coating as defined hereinabove.

When the range of absorption must be broad, the covering advantageously comprises a plurality of layers of different coatings, each having, for example, a specific range of absorption.

Figure 2:
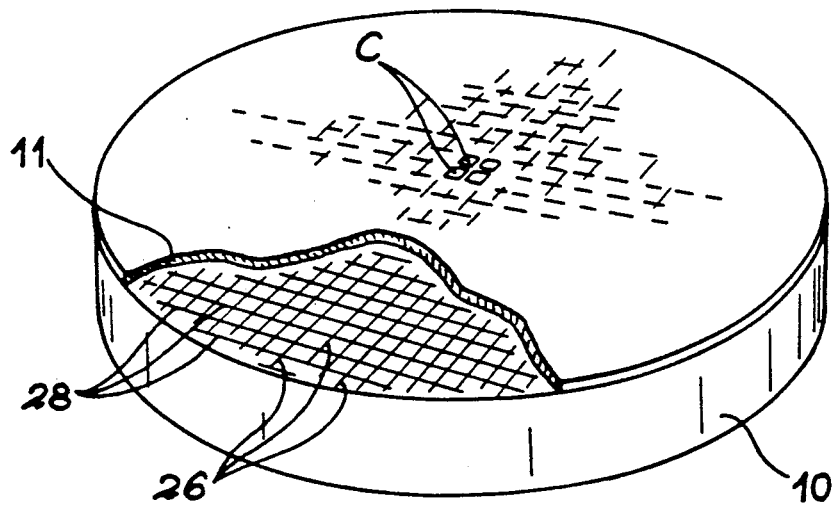
Figure 3:
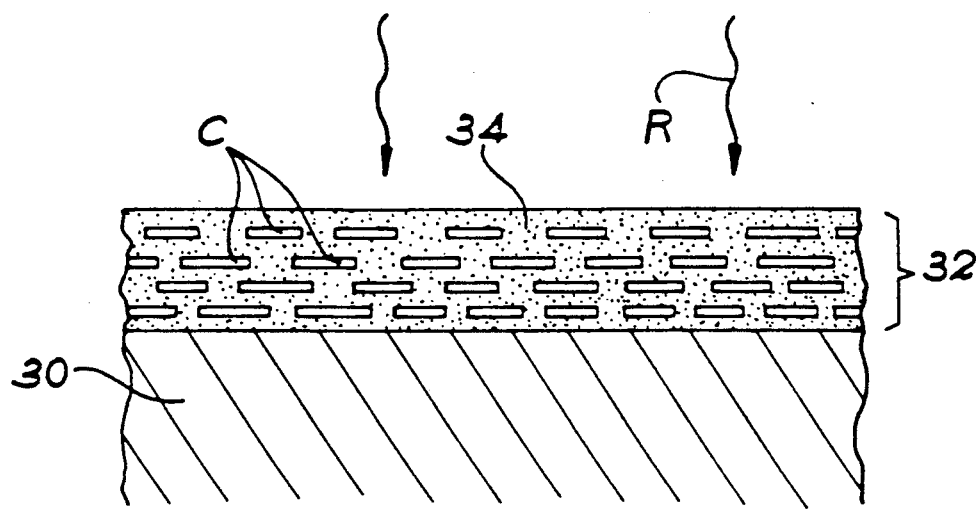
Figure 4:
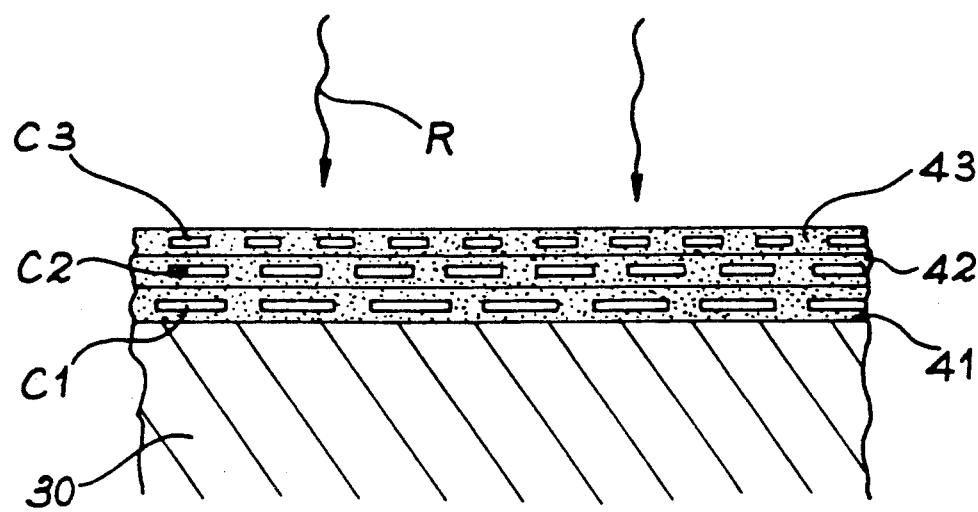

In any event, the features of the invention will become more clearly evident in the light of the description which follows. This description relates to examples which are given on an explanatory and non-limiting basis and refers to accompanying drawings, in which:

FIG. 1 illustrates, in cross-section, a step of the process of manufacture of a coating according to the invention, FIG. 2 illustrates, in a top plan view, this same step, FIG. 3 shows an object covered with a covering according to the invention, and FIG. 4 shows a covering having a plurality of different layers.

FIG. 1 shows a first step of the process of manufacture of a coating according to the invention. On a plane substrate 10, there is deposited a stack 11 of various thin layers. In the example illustrated (which is clearly not to scale and which is very diagrammatic) there are found, in succession, an insulating layer 12, a magnetic layer 14, an insulating layer 16, a magnetic layer 18, an insulating layer 20, a magnetic layer 22 and finally an insulating layer 24.

The amorphous magnetic materials which can be used are preferably ferromagnetic materials based on cobalt containing at least one element selected from among zirconium or niobium. These materials may be of the $Co_xNb_yZr_z$ type, with x ranging from 80 to 95 and, for example, ranging from 87 to 93, and y+z having the value 100-x, where y and z may each adopt values ranging from 20 to 0.

As magnetic materials which may be used, it is possible to refer, for example, to $Co_{87}Nb_{11.5}Zr_{1.5}$, or $Co_{89}Nb_{6.5}Zr_{4.5}$, or $Co_{89}Zr_z$ and/or $Co_{93}Zr_7$.

As electrically insulating materials, it is possible to refer to quartz, glass, silica, amorphous silicon, alumina, silicon nitride, zinc sulphide and carbon.

With regard to the support 10, this may be of any material and, for example, of metal or of soluble material, or of glass or of silicon.

In application to the absorption of microwaves, the number of alternating layers of magnetic material and of insulating material is a function of the frequency of the field which it is desired to absorb. As a general rule, the higher the frequency to be absorbed, the smaller is the number of layers.

For example, for a frequency of 500 MHz, approximately 2,500 layers will be used. However, for 2 GHz this number falls to approximately 300.

Various means are possible for splintering the stack 11 into chips. As illustrated in FIG. 2, it is possible to machine (for example using a milling cutter), on the upper face of the substrate, fine traces 26 and 28, which will draw a mosaic of small rectangles. The stack 11 will then be fractured naturally along these lines and give a multiplicity of chips C. These chips appear, diagrammatically, in FIG. 1, in cross-section, and in FIG. 2, in perspective.

However, it is also possible to cut up the stack of layers (for example using a laser) or alternatively to lift off the stack and then to crush it, or to use a substrate which is soluble in a chemical solution etc. . . .

In this operation of obtaining the chips, the aim is to impart to the latter, on average, a shape and dimensions which are appropriate for the intended purpose. Depending upon the frequency to be absorbed, the chips may be larger or smaller, with an identical structure.

The chips may then be placed in an oven brought to a temperature less than the crystallization temperature, i.e. approximately 250°–400° C. and a magnetic field directed within their plane is applied to them. The effect of this operation is to orient the magnetization in an anisotropic manner, in this specific case in the plane of the chips.

The chips obtained in this way are then mixed with a binder. A wide variety of materials is possible in this connection: oxide, mixture of oxides, epoxy resins, thermosetting resins, photoresist, adhesives, etc.

Naturally, a plurality of types of chips may be mixed in a same binder, either of the same structure but of differing dimensions or shapes (rectangular, triangular, square, lozenge shaped etc.) or of differing structures and of the same shape, or of differing structures and shapes.

A covering according to the invention is represented, in cross-section, in FIG. 3. The covering 32 comprises chips C, all parallel, on average, to the surface of an object 30, these chips being embedded in the binder 34. An electromagnetic radiation R, which impinges upon the object thus covered, is absorbed by and in the covering.

The covering operation is undertaken as for a painting, either cold, or hot if the binder is thermosetting.

In FIG. 3, the covering consists of a layer of a same coating. However, it is possible to cover a same object by a plurality of layers consisting of different coatings, as illustrated in FIG. 4. This figure shows an object 30 covered with a first layer 41 of a coating having chips of type C1, this layer itself being covered with a second layer 42 of a coating having chips of type C2, this layer itself being covered with a third layer 43 of a coating having chips of type C3.

Each layer may be defined to absorb a relatively narrow wavelength range, the three ranges partially overlapping to define a broad range in which the absorption of the radiation will be effected.

In the aforegoing description, emphasis has been placed on systems including a plurality of magnetic and insulating layers. It is self-evident that the invention is not limited to this mode of implementation. It may also make use of other absorbing architectures and, for example, systems which are purely interferential, or interferential with losses, or systems with pure losses or systems having a single layer (of cobalt-silicon or cobalt-boron-silicon, or iron-boron amorphous composite, which is commercially available in the form of a dipped strip) and, generally, any architecture capable of attenuating the electromagnetic radiation.

I claim:

1. Coating comprising a binder (34) and a load including chips with at least one thin layer capable of absorbing a electromagnetic radiation and wherein the thin layer is a stack of thin layers (12, 14, . . . , 22, 24), this stack being capable of absorbing the electromagnetic radiation.

2. Coating according to claim 1, characterized in that the stack of thin layers includes a stack of alternately amorphous magnetic (14, 18, 22) and electrically insulating (12, 16, 20, 24) layers.

3. Coating according to claim 2, characterized in that the amorphous magnetic material is a ferromagnetic material having a high magnetic permeability.

4. Coating according to claim 3, characterized in that the magnetic material is an alloy of cobalt and of at least one element selected within the group comprising zirconium and niobium.

5. Coating according to claim 1, characterized in that the stack of layers includes an interferential and/or loss absorption system.

6. Coating according to claim 1, characterized in that each chip consists of a stack of layers which are transparent to the radiation, the refractive index of these layers alternating.

7. Coating comprising a binder (34) and a load including chips, each chip having at least one thin layer capable of absorbing an electromagnetic radiation and wherein the coating comprises various types of chips (C1, C2, C3) having different absorption characteristics.

8. Process for the manufacture of a coating having a binder and a load including chips with at least one thin layer capable of absorbing an electromagnetic radiation, wherein the thin layer is a stack of thin layers, the stack being capable of absorbing the electromagnetic radiation ($X_1$) characterized in that it comprises the following operations:

a stack (11) of thin layers is deposited on a substrate (10) under vacuum, this stack being capable of absorbing an electromagnetic radiation, this stack is splintered in order to reduce it to chips, the chips (C) are mixed with a binder (34) ($X_2$).

9. Process according to claim 8, characterized in that a stack of alternately amorphous magnetic (14, 18, 22) and electrically insulating (12, 16, 20, 24) layers is deposited on the substrate (10) under vacuum, and in that, after having splintered the stack, the chips obtained are placed in an oven and a magnetic field is applied to them.

10. Covering, characterized in that it comprises at least one layer of coating (32) according to any one of claims 2 to 8.

11. Covering according to claim 10, characterized in that it comprises a plurality of layers of different coatings (41, 42, 43).

12. Covering according to claim 11, characterized in that each layer possesses a specific range of absorption.

* * * * *